United States Patent
Chen et al.

(10) Patent No.: US 12,362,813 B2
(45) Date of Patent: Jul. 15, 2025

(54) BEAM RECOVERY PROCESSING METHOD, BEAM RECOVERY METHOD, AND DEVICE, SYSTEM AND MEDIUM

(71) Applicant: ZTE CORPORATION, Guangdong (CN)

(72) Inventors: Yijian Chen, Shenzhen (CN); Nan Zhang, Shenzhen (CN); Zhaohua Lu, Shenzhen (CN); YuNgok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 32 days.

(21) Appl. No.: 18/408,404

(22) Filed: Jan. 9, 2024

(65) Prior Publication Data

US 2024/0146385 A1     May 2, 2024

Related U.S. Application Data

(63) Continuation of application No. 18/146,086, filed on Dec. 23, 2022, now Pat. No. 11,902,004, which is a (Continued)

(30) Foreign Application Priority Data

Mar. 24, 2017    (CN) .................. 201710184664.1

(51) Int. Cl.
*H04B 7/08*      (2006.01)
*H04B 7/06*      (2006.01)
(Continued)

(52) U.S. Cl.
CPC .......... *H04B 7/088* (2013.01); *H04B 7/0626* (2013.01); *H04L 5/0051* (2013.01); *H04W 24/08* (2013.01);
(Continued)

(58) Field of Classification Search
None
See application file for complete search history.

(56) References Cited

U.S. PATENT DOCUMENTS 9,843,465 B2    12/2017   Mehrabani et al.
9,900,196 B2     2/2018   Mehrabani et al.
(Continued)

FOREIGN PATENT DOCUMENTS

CN        1568038 A     1/2005
CN     102143522 A     8/2011
(Continued)

OTHER PUBLICATIONS

Nokia, Alcatel-Lucent Shanghai Bell "Beam Recovery in NR" 3GPP TSG-RAN WG2 Meeting #97, Feb. 13-17, 2017, XP051212262.
(Continued)

*Primary Examiner* — Christopher T Wyllie
(74) *Attorney, Agent, or Firm* — Knobbe, Martens, Olson & Bear, LLP

(57) ABSTRACT

Provided are a beam recovery processing method, a beam recovery method, a base station and a terminal. The beam recovery processing method includes: determining, by a transmitting end, a configuration information set for instructing a receiving end to perform a beam recovery; and transmitting, by the transmitting end, the configuration information set to the receiving end.

19 Claims, 2 Drawing Sheets

---

A transmitting end determines a configuration information set for instructing a receiving end to perform a beam recovery     S202

The transmitting end transmits the configuration information set to the receiving end     S204

Related U.S. Application Data continuation of application No. 16/497,212, filed as application No. PCT/CN2018/080344 on Mar. 23, 2018, now Pat. No. 11,558,100.

(51) Int. Cl.
| | |
|---|---|
| *H04L 5/00* | (2006.01) |
| *H04W 24/08* | (2009.01) |
| *H04W 72/044* | (2023.01) |
| *H04W 72/542* | (2023.01) |
| *H04W 76/27* | (2018.01) |

(52) U.S. Cl.
CPC ....... *H04W 72/046* (2013.01); *H04W 72/542* (2023.01); *H04W 76/27* (2018.02)

(56) References Cited

U.S. PATENT DOCUMENTS

| | | | |
|---|---|---|---|
| 11,558,100 B2 * | 1/2023 | Chen | H04W 72/542 |
| 2015/0139001 A1 | 5/2015 | Xue et al. | |
| 2016/0150591 A1 | 5/2016 | Mehrabani et al. | |
| 2016/0156490 A1 | 6/2016 | Mehrabani et al. | |
| 2016/0285522 A1 | 9/2016 | Kasher et al. | |
| 2016/0337881 A1 | 11/2016 | Zhang et al. | |
| 2018/0048375 A1 * | 2/2018 | Guo | H04B 7/024 |
| 2018/0062892 A1 | 3/2018 | Mehrabani et al. | |
| 2018/0083680 A1 * | 3/2018 | Guo | H04B 7/088 |
| 2018/0138962 A1 * | 5/2018 | Islam | H04B 7/0695 |
| 2018/0227031 A1 * | 8/2018 | Guo | H04W 24/10 |
| 2018/0227899 A1 * | 8/2018 | Yu | H04B 7/088 |
| 2018/0234960 A1 * | 8/2018 | Nagaraja | H04W 72/046 |
| 2019/0124640 A1 * | 4/2019 | Nagaraja | H04W 36/0055 |
| 2019/0200249 A1 * | 6/2019 | Yoon | H04W 24/08 |
| 2019/0349960 A1 * | 11/2019 | Li | H04L 1/1896 |
| 2020/0052770 A1 * | 2/2020 | Chen | H04L 5/0051 |
| 2020/0059867 A1 * | 2/2020 | Haghighat | H04W 52/367 |
| 2020/0099437 A1 * | 3/2020 | Harada | H04W 72/23 |
| 2023/0125867 A1 * | 4/2023 | Chen | H04L 5/0094 370/329 |
| 2025/0039703 A1 * | 1/2025 | Turtinen | H04W 72/23 |

FOREIGN PATENT DOCUMENTS

| | | |
|---|---|---|
| CN | 102938893 A | 2/2013 |
| CN | 103858465 A | 6/2014 |
| CN | 104734805 A | 6/2015 |
| CN | 105898686 A | 8/2016 |
| EP | 3101971 A1 | 12/2016 |
| KR | 10-2016-0088485 A | 7/2016 |
| WO | WO 2016/127488 A1 | 8/2016 |
| WO | WO 2016/0160727 A1 | 10/2016 |
| WO | WO 2016/165128 A1 | 10/2016 |
| WO | WO 2017/024516 A1 | 2/2017 |

OTHER PUBLICATIONS

ZTE, ZTE Microelectronics "Discussion on beam recovery mechanism" Feb. 13-17, 2017, 3GPP TSG RAN WG1 Meeting #88—R1-1701803.

CATT "Considerations on beam recovery mechanism" Feb. 13-17, 2017, 3GPP TSG RAN WG1 Meeting #88—R1-1702078.

CMCC "Discussion on UE triggered beam reporting for beam recovery" Feb. 13-17, 2017, 3GPP TSG RAN WG1 Meeting #88—R1-1703404.

Guangdong OPPO Mobile Telecom "On Beam Recovery Mechanism" Apr. 3-7, 2017, 3GPP TSG RAN WG1 Meeting #88bis—R1-1704608.

Office Action for Chinese Patent Application No. 201710184664.1, issued Nov. 2, 2020.

International Search Report of Application No. PCT/CN2018/080344—4 pages (Jun. 13, 2018).

Supplementary Partial European Search Report for EP 18770421 dated Mar. 15, 2021.

First Search Report for CN 201710184664.1.

Second Office Action for CN 201710184664.1.

Chinese first Search Report for Chinese Application No. 2021112235351 dated Jan. 22, 2025.

Chinese first Office Action for Chinese Application No. 202111223535.1 dated Feb. 5, 2025.

* cited by examiner

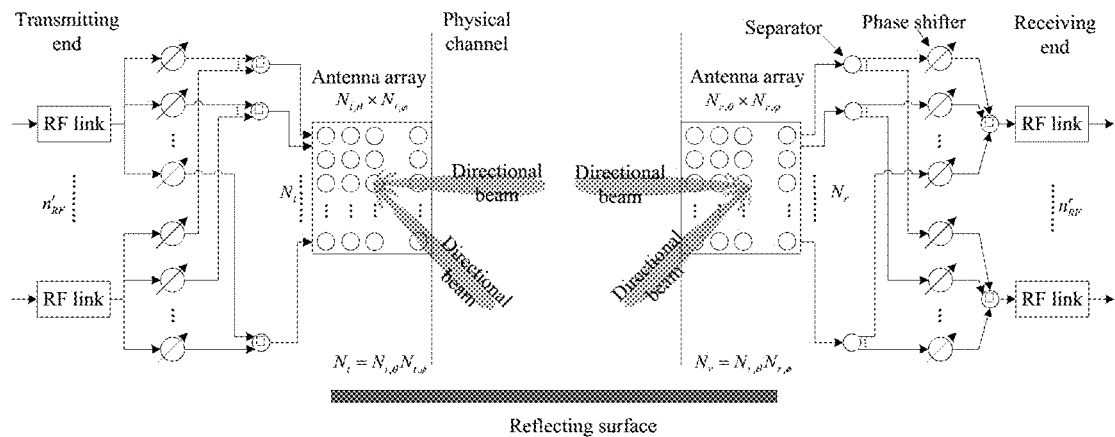

FIG. 1

```
┌─────────────────────────────────────────────────────┐
│ A transmitting end determines a configuration information set for │ ─ S202
│    instructing a receiving end to perform a beam recovery   │
└─────────────────────────────────────────────────────┘
                          ↓
┌─────────────────────────────────────────────────────┐
│ The transmitting end transmits the configuration information set │ ─ S204
│                   to the receiving end                  │
└─────────────────────────────────────────────────────┘
```

FIG. 2

BEAM RECOVERY PROCESSING METHOD, BEAM RECOVERY METHOD, AND DEVICE, SYSTEM AND MEDIUM

CROSS-REFERENCES TO RELATED APPLICATIONS

This application is a continuation of U.S. patent application Ser. No. 18/146,086 which is a continuation of U.S. patent application Ser. No. 16/497,212, filed on Sep. 24, 2019, which is a National Stage Application, filed under 35 U.S.C. 371, of International Patent Application No. PCT/CN2018/080344, filed on Mar. 23, 2018, which claims priority to a Chinese patent application No. 201710184664.1 filed on Mar. 24, 2017, disclosure of which is incorporated herein by reference in their entireties.

TECHNICAL FIELD

The present disclosure relates to the field of communications and, in particular, to a beam recovery processing method, a beam recovery method, a communication device, a communication system and a computer storage medium.

BACKGROUND

In a wireless communication system in the existing art, a transmitting end and a receiving end generally use multiple antennas for transmission and reception to acquire a higher rate. One principle of a multi-antenna technology is to use some features of a channel for beamforming to form the transmission and reception that match the features of the channel. The radiation direction of a signal is very specific, which can effectively improve system performance and obtain significant improvement of performance without increasing bandwidth and power. The multi-antenna technology is a very promising technology and is widely applied in current systems. A beamforming technology is shown in FIG. 1. FIG. 1 is a schematic diagram of the beamforming technology in the existing art. The transmitting end transmits a directional beam through the beamforming and the receiving end receives the directional beam.

The beamforming is implemented through precoding, which may form beams in a feature space and a physical space. The precoding may include baseband precoding and radio frequency (RF) precoding, which correspond to a baseband beam and an RF beam respectively. Baseband processing mainly acts on an RF path and RF processing mainly acts on an element of the RF path. The baseband precoding is performed on a baseband, and the RF precoding is performed on an RF. A beam mentioned in the present disclosure may be a baseband beam, an RF beam or a combination thereof.

When large-scale antennas are deployed on a base station side, generally, considering that the channel has a relatively high dimension, and the RF precoding and the baseband precoding coexist, measurement, feedback and transmission in a multiple-input-multiple-output (MIMO) system are generally performed in the following manner:

beam information measurement and feedback (beam training).

In step 1, a base station transmits beam reference signals in different directions and notifies the receiving end of configuration information.

In step 2, a terminal measures the received qualities of these beam reference signals and selects reference signals of better qualities from these beam reference signals to feed the reference signals of better qualities back to the base station.

In step 3, the base station performs data transmission through the precoding corresponding to the reference signals of better qualities.

Here, the base station continues to transmit narrower beams within the coverage range of the selected beams, and the terminal selects from the narrower beams to refine the beams. The base station obtains more accurate beam direction information through the feedback of the terminal. The steps for the beam training may be performed multiple times.

Alternatively, the base station may further transmit some reference signals based on the beams reported by the terminal for measuring the interference between beams or an optimal weighted combination parameter between beams. The weighting is generally performed on the baseband to obtain more combination gains, which may practically be considered as a more accurate beam (in the feature space).

After acquiring beam selection information, the base station may perform downlink transmission by using the beams. If channel state information (CSI) may be further obtained, transmission performance may be more effectively improved. Both the CSI and beam information may be acquired by measuring the measurement reference signals.

After acquiring the beam information and the CSI, the base station may perform downlink transmission with the beam information and the CSI. With increasingly higher operating frequencies, beams are used for transmission of a control channel, a data channel and the like to enhance coverage. Beam transmission has high transmission efficiency and poor robustness. As the beams are narrow, the quality of a serving beam often decreases when the terminal moves or rotates or a propagation path is blocked or obstructed, so that normal communication cannot be performed. However, after the quality of the serving beam decreases, the beams are not switched in time for the communication between the terminal and the base station, resulting in a poor communication quality and even interrupted communication and the like.

SUMMARY

Embodiments of the present disclosure provides a beam recovery processing method, a beam recovery method, a base station and a terminal, to solve at least the problem in the existing art of a communication quality decline or a poor communication quality due to a beam quality decline.

An embodiment of the present disclosure provides a beam recovery processing method. The method includes steps described below.

A transmitting end determines a configuration information set for instructing a receiving end to perform a beam recovery. The configuration information set includes at least one of: a first configuration information set, a second configuration information set, a third configuration information set or a fourth configuration information set. The first configuration information set is used for instructing the receiving end to perform beam quality monitoring according to the first configuration information set. The second configuration information set is used for instructing the receiving end to perform a beam selection according to the second configuration information set. The third configuration information set is used for instructing the receiving end to report beam recovery information to the transmitting end according to the third configuration information set, where the beam recovery information includes beam indication information and/or receiving end indication information. The fourth configuration information set is used for instructing the receiving end to determine the beam selection and/or determine whether to report the beam recovery information according to the fourth configuration information set.

The transmitting end transmits the configuration information set to the receiving end.

Another embodiment of the present disclosure provides a beam recovery method. The method includes steps described below. A receiving end receives a configuration information set for instructing the receiving end to perform a beam recovery and transmitted by a transmitting end. The receiving end performs, according to the configuration information set, at least one of operations described below. The receiving end determines first configuration information used for beam quality monitoring according to the configuration information set, and performs the beam quality monitoring according to the first configuration information. The receiving end determines fourth configuration information for determining to perform a beam selection and/or report beam recovery information according to the configuration information set, and determines the beam selection and/or determines whether to report the beam recovery information according to the fourth configuration information.

Another embodiment of the present disclosure further provides a base station including a processor and a communication apparatus. The processor is configured to determine a configuration information set for instructing a terminal to perform a beam recovery. The configuration information set includes at least one of: a first configuration information set, a second configuration information set, a third configuration information set or a fourth configuration information set. The first configuration information set is used for instructing the terminal to perform beam quality monitoring according to the first configuration information set. The second configuration information set is used for instructing the terminal to perform a beam selection according to the second configuration information set. The third configuration information set is used for instructing the terminal to report beam recovery information to the base station according to the third configuration information set, where the beam recovery information includes beam indication information and/or terminal indication information. The fourth configuration information set is used for instructing the terminal to determine the beam selection and/or determine whether to report the beam recovery information according to the fourth configuration information set.

The communication apparatus is configured to transmit the configuration information set to the terminal.

Another embodiment of the present invention further provides a terminal including a communication apparatus and a processor.

The communication apparatus is configured to receive a configuration information set for instructing the terminal to perform a beam recovery and transmitted by a base station.

The processor is configured to perform, according to the configuration information set, at least one of operations described below. The processor determines first configuration information used for beam quality monitoring according to the configuration information set, and the terminal performs the beam quality monitoring according to the first configuration information. The processor determines fourth configuration information used for determining to perform a beam selection and/or report beam recovery information according to the configuration information set, and the terminal determines the beam selection and/or determines whether to report the beam recovery information according to the fourth configuration information.

An embodiment of the present disclosure further provides a communication system including a base station and a terminal.

The base station determines a configuration information set for instructing the terminal to perform a beam recovery. The configuration information set includes at least one of: a first configuration information set, a second configuration information set, a third configuration information set or a fourth configuration information set. The first configuration information set is used for instructing the terminal to perform beam quality monitoring according to the first configuration information set. The second configuration information set is used for instructing the terminal to perform a beam selection according to the second configuration information set. The third configuration information set is used for instructing the terminal to report beam recovery information to the base station according to the third configuration information set, where the beam recovery information includes beam indication information and/or terminal indication information. The fourth configuration information set is used for instructing the terminal to determine the beam selection and/or determine whether to report the beam recovery information according to the fourth configuration information set.

The base station transmits the configuration information set to the terminal.

An embodiment of the present disclosure provides a computer storage medium, which is configured to store computer-executable instructions which, when executed, implement the beam recovery processing method or the beam recovery method in the embodiments described above.

An embodiment of the present disclosure provides a communication device including a memory and a processor. The memory is configured to store computer-executable instructions. The processor is connected to the memory and configured to execute the computer-executable instructions to implement the beam recovery processing method or the beam recovery method in the embodiments described above.

In the technical solutions of the present disclosure, the transmitting end determines the configuration information set for instructing the receiving end to perform the beam recovery, and transmits the configuration information set to the receiving end.

When the technical solutions are used, at least one of both communication parties may perform beam monitoring according to the configuration information set of the beam recovery. In this case, once a quality of a serving beam is found to decrease or decrease too much to affect a communication quality, the beam selection may be performed again according to configuration information, the serving beam is quickly switched, and a better beam is found to perform communication between the communication parties so as to avoid an inability to find a beam quality decline or select an alternative beam capable of ensuring the communication quality after the quality of the current serving beam decreases due to mobility of the terminal or a change of a channel status, improve the communication quality and system performance, solves the problem of a poor communication quality due to the beam quality decline and the problem of affected transmission performance because a base station has no good mechanism to quickly find a severe beam quality decline and find a more suitable new beam when the beam quality decreases.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings:

FIG. 1 is a schematic diagram of a beamforming technology in the existing art;

FIG. 2 is a flowchart of a beam recovery processing method according to an embodiment of the present disclosure;

DETAILED DESCRIPTION

Figure 3:
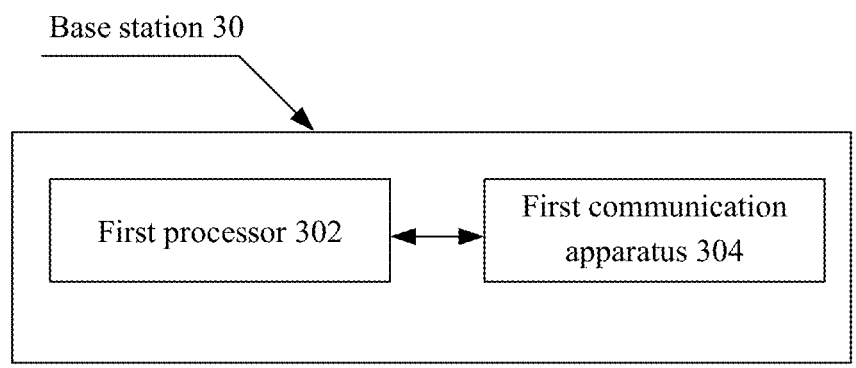
FIG. 3 is a structural diagram of hardware of a base station according to an embodiment of the present disclosure.

Embodiments of the present application provide a mobile communication network (which includes, but is not limited to, a 5G mobile communication network). A network architecture of the network may include a network side device (such as a base station) and a terminal. An information transmission method executable on the preceding network architecture is provided in this embodiment. It is to be noted that an execution environment of the information transmission method provided by the embodiments of the present application is not limited to the preceding network architecture.

In the present application, a transmitting end may be the base station and a receiving end may be a terminal device, but it is not limited thereto.

Since a beam is required for transmission of a control channel, if the base station cannot quickly learn the situation once the beam fails, a control signaling cannot be transmitted, and uplink and downlink transmissions cannot be initiated, leading to a paralyzed link. On the one hand, the terminal might not be aware that a downlink link is broken. On the other hand, even if the terminal finds no response to some uplink requests and is aware that there is something wrong with the link, the terminal can only re-initiate a access process, which wastes a lot of system resources and results in poor user experience. For example, when a quality of the beam severely decreases, the base station has no good mechanism to quickly find a problem of the beam and find a more suitable beam. The base station can quickly find the problem of the beam at the cost of frequent transmissions of measurement reference signals and frequent and regular reporting of beam information. This will impose a huge overhead pressure to both downlink and uplink transmissions, decrease system performance and affect forward compatibility. For example, when the quality of the beam severely decreases, the base station has no good mechanism to quickly find the problem of the beam and find the more suitable beam. There is no effective solution at present. In view of this, in the technical solutions provided by the embodiments of the present disclosure, the transmitting end determines a configuration information set for instructing the receiving end to perform a beam recovery, and the transmitting end transmits the configuration information set to the receiving end. In this way, if the quality of the beam decreases, beams may be quickly selected and switched according to configuration information, thereby ensuring a communication quality. A detailed description is further provided below in conjunction with specific embodiments. However, it is to be noted that the scope of the present disclosure is defined by the claims rather than the embodiments which are merely used to explain the claims. An embodiment provides a beam recovery processing method executed on the network architecture described above. FIG. 2 is a flowchart of a beam recovery processing method according to an embodiment of the present disclosure. As shown in FIG. 2, the method includes steps described below.

In step S202, a transmitting end determines a configuration information set for instructing a receiving end to perform a beam recovery.

In step S204, the transmitting end transmits the configuration information set to the receiving end.

In the preceding steps, the transmitting end determines the configuration information set for instructing the receiving end to perform the beam recovery, and transmits the configuration information set to the receiving end. When the preceding technical solution is used, a base station may find a problem of a beam more quickly and find a better beam, improving system performance and solving the problem in the existing art of affected transmission performance because the base station has no good mechanism to quickly find a severe beam quality decline and find a more suitable new beam when a quality of the beam severely decreases.

Optionally, the configuration information set includes at least one of: a first configuration information set, a second configuration information set, a third configuration information set or a fourth configuration information set. The first configuration information set is used for instructing the receiving end to perform beam quality monitoring according to the first configuration information set. The second configuration information set is used for instructing the receiving end to perform a beam selection according to the second configuration information set. The third configuration information set is used for instructing the receiving end to report beam recovery information to the transmitting end according to the third configuration information set, where the beam recovery information includes beam indication information and/or receiving end indication information. The fourth configuration information set is used for instructing the receiving end to determine the beam selection and/or determine whether to report the beam recovery information according to the fourth configuration information set.

It should be added that the beam indication information refers to information for identifying a beam, that is, after selecting a new beam, the receiving end transmits the beam indication information of the new beam to the transmitting end. The receiving end indication information refers to information for identifying the receiving end and is used for assisting the transmitting end in identifying the receiving end.

Optionally, the preceding steps may, but may not necessarily, be executed by the base station.

Optionally, the first configuration information set includes configuration information of a first reference pilot resource set used for the beam quality monitoring.

Optionally, the second configuration information set includes configuration information of a second reference pilot resource set used for the beam selection.

Optionally, the first reference pilot resource set is a subset of M1 sets of reference pilot resources, and the second reference pilot resource set is a subset of N1 sets of reference pilot resources, where M1 is less than or equal to N1, and M1 and N1 are both positive integers.

Optionally, the M1 sets of reference pilot resources are a subset of the N1 sets of reference pilot resources.

Optionally, the first reference pilot resource set includes M2 types of reference pilot resources, and the second reference pilot resource set includes N2 types of reference pilot resources, where M2 is less than or equal to N2, and M2 and N2 are both positive integers.

Optionally, the M2 types of reference pilot resources are a subset of the N2 types of reference pilot resources.

Optionally, candidate resource types of the first reference pilot resource set constitute a type set X1, and candidate resource types of the second reference pilot resource set constitute a type set X2, where X1 is a subset of X2.

Optionally, a type of the reference pilot resource includes at least one of: a channel state information reference signal (CSI-RS), a physical downlink control channel (PDCCH) demodulation reference signal (DMRS) or a synchronization signal.

Optionally, the step in which the transmitting end determines the configuration information set for instructing the receiving end to perform the beam recovery includes that the transmitting end configures at least one of the following information for the receiving end separately for different radio resource control (RRC) state sets: the first reference pilot resource set and/or a subset of the first reference pilot resource set; or the second reference pilot resource set and/or a subset of the second reference pilot resource set.

Optionally, the step in which the transmitting end determines the configuration information set for instructing the receiving end to perform the beam recovery includes that the transmitting end configures multiple beam recovery modes, and configures at least one of the following information separately for different beam recovery modes: the first reference pilot resource set and/or the subset of the first reference pilot resource set; or the second reference pilot resource set and/or the subset of the second reference pilot resource set.

Optionally, the step in which the transmitting end determines the configuration information set for instructing the receiving end to perform the beam recovery includes that the transmitting end configures multiple control channels, and configures at least one of the following information separately for different control channels: the first reference pilot resource set and/or the subset of the first reference pilot resource set; or the second reference pilot resource set and/or the subset of the second reference pilot resource set.

Optionally, the fourth configuration information set includes configuration information of a first set of preset conditions used for determining the beam selection and/or determining whether to report the beam recovery information, where a preset condition in the first set of preset conditions is used by the receiving end to perform the beam quality monitoring.

Optionally, the preset condition in the first set of preset conditions includes a quality threshold and/or a time window, where within the time window, the receiving end performs beam monitoring and determines whether a beam quality is lower than the quality threshold.

Optionally, the first set of preset conditions is configured in at least one of the following manners: the transmitting end independently configures the first set of preset conditions and/or a first subset of preset conditions for an individual first reference pilot resource sets and/or subset of the first reference pilot resource set used for the beam quality monitoring.

Optionally, the fourth configuration information set includes configuration information of a second set of preset conditions for determining the beam selection, where a preset condition in the second set of preset conditions is used by the receiving end to perform the beam selection.

Optionally, the preset condition in the second set of preset conditions includes the quality threshold and/or the time window, where within the time window, the receiving end performs the beam monitoring and determines whether the beam quality is lower than the quality threshold.

Optionally, the second set of preset conditions is configured in the following manner: the transmitting end independently configures the second set of preset conditions and/or a second subset of preset conditions for an individual second reference pilot resource sets and/or subset of the second reference pilot resource set used for the beam selection.

Optionally, a set of preset conditions is configured in at least one of manners described below. The transmitting end configures multiple control channels, and independently configures the first set of preset conditions and/or the first subset of preset conditions and/or the second set of preset conditions and/or the second subset of preset conditions for individual control channel. The transmitting end independently configures the first set of preset conditions and/or the first subset of preset conditions and/or the second set of preset conditions and/or the second subset of preset conditions for individual RRC state set. The transmitting end independently configures the first set of preset conditions and/or the first subset of preset conditions and/or the second set of preset conditions and/or the second subset of preset conditions for individual beam reporting manner. The transmitting end independently configures the first set of preset conditions and/or the first subset of preset conditions and/or the second set of preset conditions and/or the second subset of preset conditions for individual beam recovery mode.

Optionally, the third configuration information set includes a transmission resource configuration information set used for reporting the beam recovery information. A transmission resource in the transmission resource configuration information set includes at least one of: an uplink transmission antenna resource, an uplink transmission beam resource, an uplink time domain resource, an uplink frequency domain resource, an uplink code domain resource or an uplink power resource.

Optionally, third configuration information includes a transmission manner configuration information set used for reporting the beam recovery information.

Optionally, the third configuration information includes indication information for determining a priority of reporting the beam recovery information.

Optionally, the third configuration information includes indication information of reporting content of the beam recovery information.

Optionally, the third configuration information set is configured in at least one of manners described below. The transmitting end independently configures the third configuration information set and/or a subset of the third configuration information set for an individual first reference pilot resource set and/or subset of the first reference pilot resource set used for the beam selection. The transmitting end independently configures the third configuration information set and/or the subset of the third configuration information set for an individual first reference pilot resource set and/or subset of the first reference pilot resource set used for the beam selection. The transmitting end independently configures the third configuration information set and/or the subset of the third configuration information set for an individual first set of preset conditions and/or first subset of preset conditions used for the beam quality monitoring. The transmitting end independently configures the third configuration information set and/or the subset of the third configuration information set for an individual second set of preset conditions and/or second subset of preset conditions used for the beam selection. The transmitting end independently configures the third configuration information set and/or the subset of the third configuration information set for an individual RRC state set. The transmitting end independently configures the third configuration information set and/or the subset of the third configuration information set for an individual beam recovery mode. The transmitting end independently configures the third configuration information set and/or the subset of the third configuration information set for an individual control channel.

Another embodiment of the present disclosure provides a beam recovery method. The method includes steps described below. A receiving end receives a configuration information set for instructing the receiving end to perform a beam recovery and transmitted by a transmitting end. The receiving end performs, according to the configuration information set, at least one of operations described below: the receiving end determines first configuration information used for beam quality monitoring according to the configuration information set, and performs the beam quality monitoring according to the first configuration information; the receiving end determines fourth configuration information for determining a beam selection and/or determining whether to report beam recovery information according to the configuration information set, and determines the beam selection and/or determines whether to report the beam recovery information according to the fourth configuration information.

Optionally, the receiving end determines second configuration information used for the beam selection according to the configuration information set; when a new beam needs to be selected, the receiving end performs the beam selection according to the second configuration information.

Optionally, the receiving end determines third configuration information used for reporting the beam recovery information according to the configuration information set; when the beam recovery information needs to be reported, the receiving end reports the beam recovery information according to the third configuration information.

Optionally, the beam recovery information includes beam indication information and/or receiving end indication information.

Optionally, the receiving end determines content of the beam recovery information according to at least one of: a configuration signaling of the transmitting end; an RRC state; a configuration of a reporting manner for the beam recovery information; a beam recovery mode; a configuration of a second reference pilot resource set; a configuration of a first reference pilot resource set; a transmission configuration of a control channel; a measurement result of beam monitoring; a quality of a selected beam; a system duplex manner; or a configuration of an uplink control channel.

Optionally, the first configuration information includes configuration information of the first reference pilot resource set used for the beam quality monitoring.

Optionally, the receiving end determines the configuration information of the first reference pilot resource set according to at least one of: the configuration signaling of the transmitting end; the RRC state; the configuration of the reporting manner for the beam recovery information; the beam recovery mode; the configuration of the second reference pilot resource set; or the transmission configuration of the control channel.

Optionally, the second configuration information includes configuration information of the second reference pilot resource set used for the beam selection.

Optionally, the receiving end determines the configuration information of the second reference pilot resource set according to at least one of: the configuration signaling of the transmitting end; the RRC state; the configuration of the reporting manner for the beam recovery information; the beam recovery mode; the configuration of the first reference pilot resource set; the transmission configuration of the control channel; a measurement result of the beam quality monitoring; or a configuration of a first set of preset conditions.

Optionally, the fourth configuration information includes configuration information of the first set of preset conditions used for the beam selection and/or reporting the beam recovery information, where a preset condition in the first set of preset conditions is used by the receiving end to perform the beam quality monitoring.

Optionally, the first set of preset conditions includes a quality threshold, where the quality threshold is used for determining to initiate the beam selection and/or beam reporting.

Optionally, the first set of preset conditions includes a time window, where the time window is used for a transmit beam quality detection or transmit and receive a beam pair link (BPL) quality detection.

Optionally, the fourth configuration information set includes configuration information of a second set of preset conditions used for the beam selection, where a preset condition in the second set of preset conditions is used for instructing the receiving end to perform the beam selection.

Optionally, the fourth configuration information set includes configuration information of a second set of preset conditions used for the beam selection, where a preset condition in the second set of preset conditions is used for instructing the receiving end to perform the beam selection.

Optionally, the second set of preset conditions includes the quality threshold, where the receiving end determines whether to report the beam recovery information according to the quality threshold.

Optionally, the second set of preset conditions includes the time window, where the time window is used for the transmit beam quality detection or the BPL quality detection.

Optionally, the receiving end determines the fourth configuration information according to at least one of: the configuration signaling of the transmitting end; the RRC state; the configuration of the reporting manner for the beam recovery information; the beam recovery mode; the configuration of the second reference pilot resource set and/or a second reference pilot resource subset; the configuration of the first reference pilot resource set and/or a subset of the first reference pilot resource set; the transmission configuration of the control channel; or a receiving configuration of a terminal.

Optionally, a third configuration information set includes at least one of: a transmission resource configuration used for reporting the beam recovery information, a transmission manner configuration used for reporting the beam recovery information, an information content configuration used for reporting the beam recovery information or a priority configuration used for reporting the beam recovery information.

Optionally, the receiving end determines the third configuration information according to at least one of: the configuration signaling of the transmitting end; the RRC state; the beam recovery mode; the configuration of the second reference pilot resource set and/or a subset of the second reference pilot resource set; the configuration of the first reference pilot resource set and/or the subset of the first reference pilot resource set; the transmission configuration of the control channel; the fourth configuration information, a beam quality monitoring result; the quality of the selected beam; system duplex information; or the configuration of the uplink control channel.

Optionally, the receiving end determines the second reference pilot resource set according to the beam quality monitoring result.

Optionally, the receiving end determines a reporting resource and/or the reporting manner and/or reporting content of the beam recovery information according to at least one of: a beam monitoring result; a beam selection result; the RRC state; a configuration of the beam recovery mode; the system duplex manner; a configuration of the control channel; or the configuration of the second reference pilot resource set.

The present disclosure will be described below in detail in conjunction with preferred embodiments of the present disclosure.

Before the preferred embodiments of the present disclosure are described, some features of the technical solutions involved in the preferred embodiments of the present disclosure are listed.

1. A first reference pilot resource set used for beam monitoring is related. Multiple variable and/or configurable types of RSs may be supported. A first reference pilot resource may be determined with reference to some other parameters, such as an RRC state.
2. A second reference pilot resource set used for beam selection is related. Multiple variable and/or configurable types of RSs may be supported. A second reference pilot resource may be determined with reference to some other parameters, such as the RRC state. The second reference pilot resource set is a subset of the first reference pilot resource set. The second reference pilot resource may be selected based on a beam monitoring result. A wider beam is selected for a worse situation.
3. At the time of the beam monitoring and the beam selection, a time window is introduced for an attempt to receive a beam, for limiting beam monitoring time, for limiting beam selection time. Time windows may be separately set for multiple beams and/or reference signal types.
4. When a beam is reported, a reporting resource and/or a reporting manner and/or reporting content have high flexibility. A related feature is as follows: according to the beam monitoring result and/or a beam selection result and some decision criteria, different problem occurrence positions and problem severity degrees (different problem beams, different numbers of problem beams and different beam quality conditions) may correspond to different reporting resources (time, frequency, space, code and power resources); may correspond to different reporting manners (multiple beams and/or a single beam, number of transmissions, a type of beam); may correspond to different reporting content (a beam ID and/or a UE ID).
5. According to configuration of the first reference pilot resource set and/or the second reference pilot resource set, the following operations may be performed:
   i. different reporting resources may be selected (time, frequency, space, code and power resource positions and sizes);
   ii. different reporting manners may be selected (multiple beams and/or the single beam, the number of transmissions, the type of beam);
   iii. different reporting content may be selected (the beam ID and/or an RS ID and/or the UE ID).
6. According to information such as the RRC state, a configuration of a beam recovery mode, a duplex manner, a configuration of a control channel, the following operations may be performed:
   i. different reporting resources may be selected (time, frequency, space, code and power resources);
   ii. different reporting manners may be selected (multiple beams and/or the single beam, the number of transmissions, the type of beam);
   iii. different reporting content may be selected (the beam ID and/or the UE ID).
7. A priority is set and a beam with a high priority is reported (involving the selection of the second reference pilot resource).
8. Beam information may be reported with indication information of the RS ID being carried.
9. The priority is set and for the beam with the high priority, beam recovery information corresponding to the content or the type of the beam is first reported.

Methods provided by the preferred embodiments of the present disclosure have the preceding features. The following are multiple specific embodiments in the preferred embodiments of the present disclosure, and the technical solutions of the present application may be understood in conjunction with the multiple specific embodiments described below.

In step 101, a base station configures an uplink resource capable of transmitting beam recovery information to a terminal.

The uplink resource configured by the base station may be some specified time-frequency positions. Since the beam recovery information may be transmitted, the base station performs a detection at the corresponding position. When a trigger condition related to a beam recovery is satisfied, the terminal may transmit the beam recovery information at these candidate time-frequency positions.

In step 201, the terminal determines a first configuration information set used for beam quality monitoring.

Optionally, the configuration includes information on reference signals for the beam quality monitoring. The terminal may determine the first configuration information set according to a configuration of the base station or some agreed rules.

In step 301, the terminal determines a second configuration information set used for a beam selection.

Optionally, the configuration includes a configuration of reference signals for the beam selection. The terminal may determine the second configuration information set according to the configuration of the base station or some agreed rules. A number of selected beams, a constraint condition and the like may be further included.

In step 401, the terminal determines a third configuration information set used for reporting the beam recovery information.

The configuration is used for determining reporting content, a reporting format, a resource of the reporting content, a transmission manner of the reporting content and the like.

In step 501, the terminal determines a fourth configuration information set used for determining the beam selection and/or reporting.

Optionally, the configuration includes some criteria and parameters for determining whether steps for the beam selection and/or the beam reporting need to be performed.

In step 601, the terminal measures a quality of a downlink beam according to the first configuration information set.

Optionally, received power may be determined, or a channel loss corresponding to the beam may be determined.

In step 701, the terminal determines whether a trigger condition for the beam selection and/or reporting is satisfied according to the fourth configuration information set.

Optionally, some manners are specifically described in the specific embodiments described below.

In step 801, when the trigger condition for the beam selection is satisfied, the terminal performs the beam selection according to second configuration information.

After a beam selection range is determined, the beam selection may be performed.

In step 901, when the trigger condition for the beam reporting is satisfied, the terminal reports the beam recovery information according to third configuration information.

Optionally, the beam recovery information includes index information of a selected beam and/or a UE ID, which may carried in an explicit signaling or indicated implicitly by a transmission position and/or sequence of the beam recovery information. The terminal selects a resource subset from a reserved resource set and transmits beam recovery request information. The resource subset is selected according to an ID of a better beam which meets a condition and/or the UE ID of the terminal. A position of the resource subset implicitly indicates the ID of the better beam and/or the UE ID of the terminal. If the index reporting of multiple beams is supported, a UE may transmit beam recovery requests on multiple resource subsets.

The base station blindly detects the beam recovery request information transmitted by the UE, and acquires indication information of the better beam and/or the UE ID according to an uplink transmission resource. When different content is reported, transmission policies of the terminal are accordingly configured or agreed. The base station subsequently performs different steps. Some specific steps are divided into several kinds.

In a case 1, beam recovery content first reported by the UE only includes indication information of the selected beam.

In step 1001, in this case, when performing step 901, the terminal determines the uplink transmission resource (including time, frequency and code resources) according to the ID of the selected beam, and transmits the beam recovery request within the configured resource subset. The base station blindly detects the beam recovery request information transmitted by the UE, and determines which beam is the selected new beam according to a receiving time, frequency or code resource in a correct blind detection.

In step 1002, the base station transmits downlink control information using the new beam on an agreed position and allocates a physical uplink shared channel (PUSCH) resource. The agreed position is optionally defined based on reporting time of the beam recovery information. At this time, since which UE has a problem beam is unknown, the downlink control information may be scrambled in an agreed manner.

In step 1003, the terminal blindly detects a downlink control channel at the agreed position. The agreed position is optionally defined based on the reporting time of the beam recovery information. If the terminal succeeds in detecting the downlink control channel, the terminal may acquire the downlink control information. If multi-beam transmission is supported, the control channel may be detected in a multi-beam mode.

In step 1004, the terminal feeds the UE ID back to the base station through an allocated uplink resource. After acquiring the UE ID, the base station communicates with the UE using a control channel of the new beam. Since a communication link is established and the control channel is recovered, a beam training may be performed subsequently to obtain a better beam.

In a case 2(a), the beam recovery content first reported by the UE only includes the UE ID, and channel reciprocity holds.

In step 1011a, in this case, when executing step 901, the terminal may select (one or more) optimal uplink transmit beams according to reciprocity, and repeatedly transmit the beam recovery request multiple times using the beams within the configured resource subset. The base station blindly detects the beam recovery request information transmitted by the UE, and may learn which UE transmits the beam recovery request by comparing the receiving time, frequency or code resource in the correct blind detection and uplink transmission resources configured for UEs.

In step 1012a, the base station reciprocally obtains an optimal downlink transmit beam according to an optimal uplink receive beam and transmits the downlink control channel using the beam.

In step 1013a, the terminal detects the downlink control channel using an optimal downlink receive beam corresponding to the optimal uplink transmit beam. A control link is established.

In a case 2(b), the beam recovery content first reported by the UE only includes the UE ID, and the channel reciprocity is inaccurate.

In step 1011b, in this case, when executing step 901, the terminal needs to perform multiple scanning transmissions in the uplink, and may first attempt to perform the scanning transmission within a beam range. In case of a failure, the range is expanded. In every transmission, the terminal repeatedly transmits the beam recovery request multiple times by using the beam within the configured resource subset.

In step 1012b, the base station blindly detects the beam recovery request information transmitted by the UE, and may learn which UE transmits the beam recovery request by comparing the receiving time, frequency or code resource in the correct blind detection and the uplink transmission resources configured for UEs.

In step 1013b, the base station transmits specific DCI in a common PDCCH to allocate an uplink resource to the terminal which needs to perform the beam recovery as a resource for reporting the beam ID.

In step 1014b, the base station determines a transmit beam of a specific control channel according to the reported ID to establish the control link. The control channel may be used for the subsequent communication with the terminal, and the beam training may be further performed to obtain the better beam.

In a case 3, the beam recovery content first reported by the UE includes the UE ID and beam indication information.

In step 1021, in this case, when executing step 901, when the trigger condition is satisfied, the terminal selects the resource subset from the reserved resource set to transmit the beam recovery request information. The resource subset is selected according to a resource set pre-configured by the base station for the UE and an ID of the downlink beam selected by the UE. A transmit resource of the beam recovery request information implicitly reflects which UE transmits the beam recovery request information and information on an ID of an optimal downlink beam measured by the UE.

In case of good reciprocity, the terminal may transmit the beam recovery request information only by using an uplink beam reciprocally obtained by the optimal downlink beam. If the reciprocity is not ideal, the terminal may perform uplink transmission of the beam recovery request information by using multiple possible beams. If the beams are still not ideal, the beam range continues to be expanded.

In step 1022, the base station blindly detects the beam recovery request information transmitted by the UE, and may learn which UE transmits the beam recovery request by comparing the receiving time, frequency or code resource in the correct blind detection and the uplink transmission resources configured for UEs.

In step 1023, the base station determines a transmit beam of a UE-specific control channel according to the reported beam ID to establish the control link. The control channel may be used for the subsequent communication with the terminal, and the beam training may be further performed to obtain the better beam.

Candidate types of measurement reference signals which may be considered for a downlink beam recovery includes types described below.

A reference signal type 1 is a CSI RS.
A reference signal type 2 is a common-PDCCH DMRS.
A reference signal type 3 is a synchronization signal.

Optionally, the preceding types may be configured by a base station, and each terminal may separately configure a beam recovery reference signal type.

The same terminal may support one or more types of beam recovery reference signals.

The base station may also configure multiple sets of resources of the same type of pilot frequency, such as a CSI-RS resource 1 and a CSI-RS resource 2. Beam configurations, such as a width, a number of beams and a number of ports, of the two CSI-RS resources may be different. The terminal may perform the beam recovery based on each of multiple CSI-RS resources or a combination of the multiple CSI-RS resources.

It is to be noted that the beam recovery here includes two cases: for the beam monitoring and for the selection of the better beam.

A configuration information set used for a beam recovery includes a first configuration information set used for beam quality monitoring.

The first configuration information set includes one or more pieces of first configuration information. The first configuration information includes a configuration of reference signals that need to be monitored, and further includes configuration information of a first reference pilot resource set, such as a configuration of a reference signal type, a transmission resource indication configuration, transmit power, a transmission time-frequency resource position, transmission pre-encoding information, a resource numbering rule, and transmit antennas. The first configuration information may include some configurations of receiving parameters.

A terminal may determine the first configuration information through an agreement or a configuration signaling of a base station. For the configuration signaling of the base station, the base station needs to determine the configuration of reference signals and transmits the configuration of references signals to the terminal through a high-layer or physical layer signaling.

In a sub-embodiment 1, a beam to be monitored is determined based on a beam configuration of a control channel.

In an option-1 of the sub-embodiment 1, a receiving end and a transmitting end agree a certain control channel or some control channels, or the base station configures and specifies the certain control channel or some control channels for the terminal. The terminal determines a beam currently used by the control channel according to beam configuration information, and determines a measurement reference signal corresponding to the beam.

For example, the base station configures and specifies one control channel to be monitored, and the beam used by the control channel is defined based on a CSI-RS. An object measured in the beam recovery is the CSI-RS. The terminal measures and monitors the CSI-RS.

For example, the base station configures and specifies two control channels to be monitored, and the beam used by one control channel is defined based on the CSI-RS. The beam of the other control channel is defined based on an SS. The object measured in the beam recovery is the CSI-RS and the SS. The terminal measures and monitors the CSI-RS and the SS.

Another case is that a primary control channel and a secondary control channel are divided when the control channels are configured. The transmitting end and the receiving end agree to measure and monitor a reference signal corresponding to a beam currently used by the primary control channel and the base station is not required to specify a control channel to be detected. Therefore, no additional signaling is required and this case belongs to a pre-agreement.

In an option-2 of the sub-embodiment 1, the terminal determines all control channels according to a configuration related to the control channels and a beam set that may be used by all the control channels. Beams included in the beam set may correspond to X types/sets of measurement reference signals, and X types/sets of reference signals are measured.

For example, the base station configures multiple control channels for the terminal. A transmit beam of some control channels is defined based on a CSI-RS resource 1, and a beam of some control channels is defined based on a CSI-RS resource 2. A reference object of the beam recovery is the CSI-RS resource 1 and/or the CSI-RS resource 2.

For example, the base station configures multiple control channels. The transmit beam of some control channels is defined based on the CSI-RS resource 1, and the beam of some control channels is defined based on the SS. The reference object of the beam recovery is the CSI-RS resource 1 and/or the SS.

In a sub-embodiment 2, the base station configures and indicates a measurement reference signal related to the beam recovery.

A difference from the sub-embodiment 1 is that the sub-embodiment 2 has no strong relationship with the control channel. The base station directly configures and specifies a type, a number, and a resource ID of the measurement reference signal related to the beam recovery.

A specific manner may be that the base station specifies a beam or a beam set to be monitored of the control channel from all candidate beams of the control channel. The beam set may include multiple beams of the control channel. The terminal determines the reference signal to be measured and the beam to be monitored according to the beam set. In a more complex case, the beam set may include multiple types of beams defined based on different types of reference signals. For simplicity, a number and a type of beams included in the beam set may be defined. The terminal determines reference signals corresponding to the beams included in the beam set.

It is to be noted that multiple beams to be monitored may be supported, and the multiple beams may be the same type of reference signal or different types of reference signals.

The configuration information set used for the beam recovery includes a second configuration information set used for a beam selection. Second configuration information in the second configuration information set mainly includes a configuration of reference signals used for the beam selection, and further includes configuration information of a second reference pilot resource set, such as the transmission resource indication configuration, the transmit power, the transmission time-frequency resource position, the transmission pre-encoding information, the resource numbering rule, and the transmit antennas. The second configuration information may also be some configurations of receiving parameters. The terminal determines the configuration through the agreement and the configure signaling of the base station. For the configuration signaling of the base station, the base station needs to determine the configuration of reference signals and transmits the configuration of references signals to the terminal through the high-layer or physical layer signaling.

It is to be noted that multiple reference signal sets used for the beam selection may be supported, and multiple optional beams may also be selected from one reference signal set. The multiple beams may be the same type of reference signal or different types of reference signals.

The configuration information set used for the beam recovery includes a third configuration information set used for reporting beam recovery information.

Optionally, the beam recovery information includes beam indication information and/or receiving end indication information. Other information related to the beam recovery is not excluded. The third configuration information set includes a transmission mode indication, a transmission resource indication, a reporting content indication, a reporting criterion, and the like of the beam recovery information, such as a number of reported beams and a priority principle.

The configuration information set used for the beam recovery includes a fourth configuration information set used for determining the beam selection and/or reporting.

Optionally, the fourth configuration information set used for determining the beam selection and/or reporting includes a beam quality threshold. For example, when a beam is monitored, whether the beam is lower than a configured first threshold within a period of time needs to be determined. When a beam is selected, it is determined whether the selected beam is higher than a configured second threshold. If multiple beams are monitored, separate configurations may be required. There are also some criteria for determining whether to select one beam or multiple beams.

Optionally, the first reference pilot resource set is a subset of M1 sets of reference pilot resources, and the second reference pilot resource set is a subset of N1 sets of reference pilot resources, where M1 is less than or equal to N1, and M1 and N1 are both positive integers. Optionally, the M1 sets of reference pilot resources are a subset of the N1 sets of reference pilot resources.

Optionally, the first reference pilot resource set includes M2 types of reference pilot resources, and the second reference pilot resource set includes N2 types of reference pilot resources, where M2 is less than or equal to N2, and M2 and N2 are both positive integers. Optionally, the M2 types of reference pilot resources are a subset of the N2 types of reference pilot resources.

Optionally, candidate resource types of the first reference pilot resource set constitute a type set X1, and candidate resource types of the second reference pilot resource set constitute a type set X2, where X1 is a subset of X2.

Optionally, a type of a reference pilot resource includes one or more of a CSI-RS, a PDCCH DMRS or a synchronization signal.

Optionally, the transmitting end separately configures the first reference pilot resource set/a subset of the first reference pilot resource set for different RRC state sets.

Optionally, the transmitting end separately configures the second reference pilot resource set/a subset of the second reference pilot resource set for different RRC state sets.

Here, an RRC state commonly includes a connected state and an idle state. A newly defined state may also be included. The RRC states may be divided into multiple sets. The first reference pilot resource set/the subset of the first reference pilot resource set may be separately configured for each set of RRC states. The second reference pilot resource set/the subset of the second reference pilot resource set may be separately configured for each set.

The receiving may separately determine the first reference pilot resource set/the subset of the first reference pilot resource set for different RRC state sets. The receiving end may determine the first reference pilot resource set/the subset of the first reference pilot resource set through the configuration signaling of the base station in conjunction with a current RRC state. The receiving end may also determine the first reference pilot resource set/the subset of the first reference pilot resource set through an agreed rule/parameter in conjunction with the current RRC state.

The receiving may separately determine the second reference pilot resource set/the subset of the second reference pilot resource set for different RRC state sets. The receiving end may determine the second reference pilot resource set/the subset of the second reference pilot resource set through the configuration signaling of the base station in conjunction with the current RRC state.

The receiving end may also determine the second reference pilot resource set/the subset of the second reference pilot resource set through the agreed rule/parameter in conjunction with the current RRC state.

Optionally, the transmitting end separately configures the first reference pilot resource set/the subset of the first reference pilot resource set for different beam recovery modes.

Optionally, the transmitting end separately configures the second reference pilot resource set/the subset of the second reference pilot resource set for different beam recovery modes.

Here, multiple beam recovery modes may be defined. For example, several processes in a specific embodiment 3 may be defined as different beam recovery beams. A newly defined beam recovery mode may be further included. The beam recovery modes may be divided into multiple sets. The first reference pilot resource set/the subset of the first reference pilot resource set may be separately configured for each set of beam recovery modes. The second reference pilot resource set/the subset of the second reference pilot resource set may be separately configured for each set.

The receiving may separately determine the first reference pilot resource set/the subset of the first reference pilot resource set for different beam recovery modes. The receiving end may determine the first reference pilot resource set/the subset of the first reference pilot resource set through the configuration signaling of the base station in conjunction with a current beam recovery mode.

The receiving end may also determine the first reference pilot resource set/the subset of the first reference pilot resource set through the agreed rule/parameter in conjunction with the current beam recovery mode.

The receiving may separately determine the second reference pilot resource set/the subset of the second reference pilot resource set for different beam recovery modes. The receiving end may determine the second reference pilot resource set/the subset of the second reference pilot resource set through the configuration signaling of the base station in conjunction with the current beam recovery mode. The receiving end may also determine the second reference pilot resource set/the subset of the second reference pilot resource set through the agreed rule/parameter in conjunction with the current beam recovery mode. Optionally, the transmitting end separately configures the first reference pilot resource set/the subset of the first reference pilot resource set for different control channels.

Optionally, the transmitting end separately configures the second reference pilot resource set/the subset of the second reference pilot resource set for different control channels.

Here, the base station may configure multiple control channels, whose transmission manners may differ from each other. After the control channels are divided into sets, the first reference pilot resource set/the subset of the first reference pilot resource set may be separately configured for each set of control channels. The second reference pilot resource set/the subset of the second reference pilot resource set may be separately configured for each set of control channels.

The receiving may separately determine the first reference pilot resource set/the subset of the first reference pilot resource set for different control channels. The receiving end may determine the first reference pilot resource set/the subset of the first reference pilot resource set through the configuration signaling of the base station in conjunction with a currently used control channel.

The receiving end may also determine the first reference pilot resource set/the subset of the first reference pilot resource set through the agreed rule/parameter in conjunction with the currently used control channel.

The receiving may separately determine the second reference pilot resource set/the subset of the second reference pilot resource set for different control channels. The receiving end may determine the second reference pilot resource set/the subset of the second reference pilot resource set through the configuration signaling of the base station in conjunction with the current control channel. The receiving end may also determine the second reference pilot resource set/the subset of the second reference pilot resource set through the agreed rule/parameter in conjunction with the current control channel.

Fourth configuration information includes configuration information of a first set of preset conditions used for the beam selection and/or reporting. A preset condition in the first set of preset conditions acts on a step and/or a result of the beam quality monitoring.

A type of the preset condition of the first set of preset conditions is a quality threshold. The quality threshold is used for determining whether a monitored beam quality coincides with a condition defined by the quality threshold.

A type of the preset condition of the first set of preset conditions is a time window T1. The time window T1 is used for defining a beam measurement time range. For example, how many times the beam quality is lower than the quality threshold within the time window. Alternatively, it is determined whether an average quality within the time window is lower than the quality threshold. Alternatively, it is determined whether a lowest quality within the time window is lower than the quality threshold. There may be many criteria, but the time window needs to be defined here. The time window T1 may be configured by the transmitting end for the receiving end, or agreed by the transmitting end and the receiving end.

The fourth configuration information includes configuration information of a second set of preset conditions used for the beam selection and/or reporting. A preset condition in the first set of preset conditions acts on a step and/or a result of the beam selection and/or reporting.

A type of the preset condition of the second set of preset conditions is the quality threshold. The quality threshold is used for determining whether a quality of a selection beam coincides with the condition defined by the quality threshold. Only the condition is met, can the reporting be performed.

Multiple quality thresholds may be set to separately correspond to multiple selected beams.

A type of the preset condition of the first set of preset conditions is a time window. The time window is used for defining a beam selection measurement time range. There may be many criteria, but the time window needs to be defined here. The time window may be configured by the transmitting end for the receiving end, or agreed by the transmitting end and the receiving end.

The first set of preset conditions is configured in one or more of manners described below.

The transmitting end separately configures the first set of preset conditions/a first subset of preset conditions for different first reference pilot resource sets/subsets of the first reference pilot resource set used for the beam quality monitoring.

The transmitting end separately configures the first set of preset conditions/the first subset of preset conditions for different RRC state sets.

The transmitting end separately configures the first set of preset conditions/the first subset of preset conditions for different beam reporting manners.

The transmitting end separately configures the first set of preset conditions/the first subset of preset conditions for different beam recovery modes.

The second set of preset conditions is configured in one or more of manners described below.

The transmitting end separately configures the second set of preset conditions/a second subset of preset conditions for different second reference pilot resource sets/subsets of the second reference pilot resource set used for the beam selection.

The transmitting end separately configures the second set of preset conditions/the second subset of preset conditions for different RRC state sets.

The transmitting end separately configures the second set of preset conditions/the second subset of preset conditions for different beam reporting manners.

The transmitting end separately configures the second set of preset conditions/the second subset of preset conditions for different beam recovery modes.

The transmitting end configures multiple control channels, and separately configures the first set of preset conditions and/or the first subset of preset conditions and/or the second set of preset conditions and/or the second subset of preset conditions for different control channels.

The third configuration information set includes a transmission resource configuration information set used for the beam reporting.

A resource includes one or more of: an uplink transmission antenna resource; an uplink transmission beam resource; an uplink time domain resource; an uplink frequency domain resource; an uplink code domain resource; or an uplink power resource.

Third configuration information includes a transmission resource configuration information set used for the beam reporting, such as a single beam for transmission or multiple beams for transmission.

The third configuration information includes a content configuration information set used for the beam reporting, such as whether a selected beam or multiple selected beams are reported, whether a UE ID or a beam ID is reported, or whether both the UE ID and the beam ID are reported. When multiple different beams are selected, which one beam is preferentially reported.

The third configuration information set is configured in one or more of manners described below.

The transmitting end separately configures the third configuration information set/a subset of the third configuration information set for different first reference pilot resource sets/subsets of the first reference pilot resource set used for the beam selection.

The transmitting end separately configures the third configuration information set/a subset of the third configuration information set for different first reference pilot resource sets/subsets of the first reference pilot resource set used for the beam selection.

The transmitting end separately configures the third configuration information set/the sub set of the third configuration information set for different first sets of preset conditions/first subsets of preset conditions.

The transmitting end separately configures the third configuration information set/the subset of the third configuration information set for different second sets of preset conditions/second subsets of preset conditions.

The transmitting end separately configures the third configuration information set/the subset of the third configuration information set for different RRC state sets.

The transmitting end separately configures the third configuration information set/the subset of the third configuration information set for different beam recovery modes.

The transmitting end separately configures the third configuration information set/the subset of the third configuration information set for different control channels.

If the UE transmits a beam recovery request in a scanning manner, the base station may detect the beam recovery request on multiple uplink resources. In this case, whether the beam recovery request is transmitted by the same UE should be determined according to whether a sequence is the same. The same sequence is used for transmissions of multiple uplink transmit beams.

In the preceding specific embodiment, it is not indicated whether the measurement of the beam quality is based on a beam pair link (BPL) or a transmit (Tx) beam. Both a change of the transmit beam and a change of a receive beam can lead to a decreased BPL quality, but different considerations exist in the beam recovery. If the quality threshold can be reached only through the change of the transmit beam, the beam recovery needs to be initiated. If the quality threshold can be reached through the change of the receive beam rather than the change of the transmit beam, no beam recovery needs to be initiated. A specific consideration is described below.

In step 1, the base station configures a time window T2 for the terminal.

The base station may configure multiple time windows T2 for different control channels/control beams/reference signals. T2 and T1 may be the same or different.

In step 2, when the terminal finds that a current BPL does not meet a quality requirement, the terminal needs to try finding a receive beam which enables the BPL quality to be higher than a corresponding threshold within the time window without changing the transmit beam.

In step 3, if the receive beam that meets the condition is found in step 2, no beam recovery request is transmitted; if a good receive beam cannot be found in step 2 (a possible cause is a limit of a transmission density configuration of the reference signal) to enable the BPL quality to be higher than the threshold, the beam recovery is initiated. At this time, two cases are included.

In a case A, the terminal can find other BPLs that meet the condition within the time window (the transmit beam changes), and the terminal reports information of the corresponding transmit beam. If the control channel originally has multiple BPLs, all of which meet a beam recovery condition, two options exist.

Transmit beams are reported totally independently.

Priorities are set and a transmit beam of a high priority is reported.

In a case B, the terminal cannot find other BPLs that meet the condition based on a set R of reference signal resources corresponding to the BPL within the time window, but can find other BPLs that meet the condition in another set r of reference signal resources. In this case, several cases may exist.

A new beam recovery mechanism when the beam meets the condition cannot be found using R, and this case is reported.

The base station is notified that a certain beam in the set r of reference signal resources is available, and the set r of reference signal resources is indicated in a feedback.

In a case C, within the time window, other BPLs that meet the condition cannot be found based on all beam recovery measurement reference signals. At this time, several solutions are proposed.

A random access process is directly performed.

The new beam recovery mechanism when the beam meets the condition cannot be found using R, and this case is reported.

The receiving end may determine the second reference signal resource set according to a beam monitoring result.

For example, multiple thresholds are set for beam monitoring to correspond to severity degrees of different quality problems and different severity degrees. The multiple thresholds correspond to different second reference signal resources. Some second sets of reference signal resources correspond to more beams, and some second sets of reference signal resources correspond to fewer beams.

For example, the beam monitoring is performed on multiple beams, and positions and/or the number of problem beams may separately correspond to the severity degrees of different quality problems. Different severity degrees correspond to different second reference signal resources. Some second sets of reference signal resources correspond to more beams, and some second sets of reference signal resources correspond to fewer beams.

For example, the beam monitoring is performed on multiple beams that correspond to different reference signal types. The different reference signal types may correspond to different reference signals separately. The different reference signal types also correspond to different second reference signal resources. Some second sets of reference signal resources correspond to more beams, and some second sets of reference signal resources correspond to fewer beams.

The second reference signal resource set corresponding to multiple thresholds, multiple beams, and different reference signal types may be agreed or configured.

The time window T1 or T2 described above may be configured in manners described below.

The transmitting end separately configures T1 or T2 for different first reference pilot resource sets/subsets of the first reference pilot resource set used for the beam selection.

The transmitting end separately configures T1 or T2 for different second reference pilot resource sets/subsets of the second reference pilot resource set used for the beam selection.

The transmitting end separately configures T1 or T2 for different first sets of preset conditions/first subsets of preset conditions.

The transmitting end separately configures T1 or T2 for different second sets of preset conditions/second subsets of preset conditions.

The transmitting end separately configures T1 or T2 for different RRC state sets.

The transmitting end separately configures T1 or T2 for different beam recovery modes.

The transmitting end separately configures T1 or T2 for different control channels.

The receiving end may determine a reporting resource/reporting manner/reporting content of the beam recovery information according to the beam monitoring result.

For example, multiple thresholds are set for the beam monitoring to correspond to severity degrees of different quality problems and different severity degrees. The multiple thresholds correspond to different reporting resources/reporting manners/reporting content.

For example, the beam monitoring is performed on multiple beams, and the positions and/or the number of problem beams may separately correspond to the severity degrees of different quality problems. Different severity degrees correspond to different reporting resources/reporting manners/reporting content.

For example, the beam monitoring is performed on multiple beams that correspond to different reference signal types. The different reference signal types correspond to different reporting resources/reporting manners/reporting content.

It may be agreed or configured that multiple thresholds, multiple beams, and different reference signal types correspond to different reporting resources/reporting manners/reporting content.

The reporting resource optionally includes one or a combination of time, frequency, space, code and power resources.

The reporting manner optionally includes multiple beams/a single beam, the number of transmissions, what beams are used, and a transmission technique.

The reporting content optionally includes the beam ID and/or the UEID, one beam ID or multiple beam IDs.

The receiving end may determine the reporting resource/reporting manner/reporting content of the beam recovery information according to a beam selection result.

For example, in the case of a joint selection, different reference signal sets where an optional beam is selected may correspond to different reporting resources/reporting manners/reporting content. In the case of an independent selection, optional beams in different reference signal sets may correspond to different reporting resources/reporting manners/reporting content.

The receiving end may determine the reporting resource/reporting manner/reporting content of the beam recovery information according to the beam selection result.

For example, different reference signal sets where the optional beam is selected may correspond to different reporting resources/reporting manners/reporting content.

According to the RRC state, the configuration of the beam recovery mode, a duplex manner, and the configuration of the control channel, different reporting resources, different reporting manners, and different reporting content may be selected.

These differentiated designs may make the beam recovery more targeted.

The number of resources in the second reference pilot resource set may be used for determining a size and a position of an area of the reporting resource.

The reporting resource/reporting manner/reporting content may be determined according to a type of the second reference pilot resource set.

Pilot resources included in the second reference pilot resource set may be determined according to the size and position of the area of the available reporting resource.

The receiving end and the transmitting end agree or configure a priority order for reporting selected beams, and the receiving end reports the selected beams according to the priority order.

The reporting content of a high priority is first reported, and the reporting content of a low priority is not reported or delayed.

The reporting content of the high priority is reported in a more robust manner, and the reporting content of the low priority is reported in a general manner.

The reporting content of the high priority occupies more reporting resources, and the reporting content of the low priority occupies fewer reporting resources.

Four beam recovery processes are mentioned in the preceding embodiment. In a process 1, UE information does not need to be reported when the UE performs reporting for the first time. The UE information is carried in first steps in processes 2a, 2b and 3.

The reporting of the UE information in the processes 2a, 2b and 3 may be considered together with a design of a scheduling request (SR) in the uplink transmission. Since the base station needs to know the UE information when SR information is acquired, one bit may be added to the SR.

Multiple transmission modes may be selected for the SR, for example:

(1) The SR is transmitted using a trained uplink transmit beam, and is received by the base station using a trained beam.

(2) The SR is transmitted using multiple trained transmit beams, and is received by the base station using trained beams corresponding to the transmit beams.

(3) The SR is repeatedly transmitted using the trained transmit beam for multiple times, and the base station performs receive beam scanning.

(4) The SR is repeatedly transmitted using each of multiple trained transmit beams for multiple times, and the base station performs the receive beam scanning for each of the multiple transmit beams to receive the SR.

(5) The terminal determines a transmit beam to repeatedly transmit the SR for multiple times with the same beam and the base station performs the receive beam scanning to receive the SR. The terminal may switch beams by itself (within an agreed range/or without limitations).

In the case 5, the SR is transmitted with the beam recovery information. It is to be noted that the SR may also be transmitted in a scanning manner.

In the preceding three processes described above, the beam ID needs to be carried when the UE performs reporting for the first time in the process 1. The reporting of the beam ID may be referred to a design of a physical random access channel (PRACH). However, it is noted that the reference signal for the beam recovery may not be the SS and may be the CSI-RS. The number of beams of the CSI-RS may be different from that of the SS. A capability of an RRC/MAC layer to configure a signaling cannot be used in a PRACH stage, while the capability of the RRC/MAC layer to configure the signaling may be used during the beam recovery. Therefore, an uplink resource configuration here is also different. The beam recovery is generally faster than the SS and thus has a higher time domain density requirement.

As described in the preceding specific embodiments, the beam recovery may be performed by measuring the SS, the CSI-RS, and a common physical downlink control channel (PDCCH).

Different measurement reference signals may correspond to different/independent configurations which include:

a transmission area configuration: for example, different frequency domain resources and different time domain densities (which may be related to an RS configuration);

a transmission manner configuration: different sequences in use and different transmission mode (which may be related to the RS configuration);

carried content: more content carried in some reference signals and less content carried in some reference signals;

different beam recovery processes which separately correspond to different RSs;

different reporting manners. Different recovery processes separately correspond to different RSs.

As described above, if the BPLs that meet the condition cannot be found, the RACH process is performed directly, or uplink transmit beam scanning is performed without carrying the beam ID. Only the UE ID is carried and a reporting design and a resource configuration may be specifically made for this case. The case where the beam ID is not carried should be distinguished from the process 2a descried in the preceding embodiment.

When a downlink beam is indicated, the downlink beam may be specified using different beams corresponding to different DCI formats.

For example, a DCI Format A corresponds to a beam of the SS; a DCI Format B corresponds to a beam of the CSI-RS; and a DCI Format C corresponds to a beam defined by the PDCCH DMRS.

When no beam recovery is performed, a DCI Format specific detection period may be configured.

When the beam recovery is performed, if the beam recovery is initiated based on a certain type of reference signal, the corresponding DCI format is continuously detected within an agreed time range after reporting.

Different degrees of beam quality problems correspond to different RS resource subsets. For a more serious case, the subset should include more beam resources or use a wider beam. However, if the beam quality is not very poor, or only a decrease speed exceeds a preset threshold and the practical quality has not deteriorated very much, it may mean that the optimal beam may still be located in the vicinity of the original beam, and thus the subset may include fewer pilot resource to reduce beam quantization information overheads. Similarly, different types of beams (CSI-RS beam and/or SS beam) which have problems may also correspond to different RS resource subsets. The reference Signal is simply referred to as RS. The synchronization signal is simply referred to as SS.

The base station may configure the quality threshold and the time window used for the beam monitoring. Within the time window, if the terminal finds that the beam quality cannot be higher than the quality threshold, or the beam quality decrease very fast, the beam selection and reporting need to be triggered. Within the time window, if the monitored beam can be transmitted multiple times, the terminal may try changing the receive beam to obtain a better receiving quality. The base station may separately configure the quality thresholds and the time windows corresponding to different beams because different beams may have different widths and time domain configurations for transmitting the corresponding reference signals may also be different. The base station may also configure different quality thresholds for the same beam. Different quality thresholds represent different severity degrees of the beam problem.

The time windows of the beam selection corresponding to different beam severity degrees may also be different. The time window is generally longer for a more serious beam problem so that more opportunities are provided to measure more BPLs.

Different beam quality problems may also correspond to different beam reporting modes. For example, a first mod may be adopted for a severe beam quality problem, and a third mode may be adopted for a general beam quality problem, that is, different beam reporting modes may be adopted for the two beam quality problems. It is to be noted that the beam reporting mode is a reporting mode of the beam recovery information.

The reference signal resource set used for the beam selection may include multiple types of reference signals, such as the SS beam and the CSI-RS beam. The terminal may perform the beam selection within the set. The optimal beam likely to be selected is the CSI-RS beam or the SS beam.

If the base station cannot determine a type of RS reported by the UE, the terminal needs to indicate the type of the RS when reporting the type of RS.

The above are optional embodiments of the present disclosure, and the present disclosure is not limited to the embodiments described above in specific implementations. Any two or more embodiments may be combined if not in conflict.

Compared with the existing art, the above-mentioned technical solutions have the following features:

1. A new beam recovery mechanism is provided. Compared with the beam recovery by means of a random access, this method can quickly find and recover a beam when the beam has a problem and has a little impact on user experience.

2. The beam set used for the beam recovery has more flexible beam configurations.
3. Compared with the existing art, the beam recovery process requires fewer feedback overheads and wastes fewer resources.
4. Compared with the existing art, the present disclosure can more accurately find a beam problem.
5. Compared with the beam recovery by means of the random access, the present disclosure has better performance because measurement and reporting can be performed based on a beam defined by the CSI-RS.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the technical solutions of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to the embodiments of the present disclosure.

Another embodiment of the present disclosure further provides a base station 30. FIG. 3 is a structural diagram of hardware of a base station 30 according to an embodiment of the present disclosure. As shown in FIG. 3, the base station 30 includes a first processor 302 and a first communication apparatus 304. The first processor 302 is configured to determine a configuration information set for instructing a terminal to perform a beam recovery. The configuration information set includes at least one of: a first configuration information set, a second configuration information set, a third configuration information set or a fourth configuration information set. The first configuration information set is used for instructing the terminal to perform beam quality monitoring according to the first configuration information set. The second configuration information set is used for instructing the terminal to perform a beam selection according to the second configuration information set. The third configuration information set is used for instructing the terminal to report beam recovery information to the base station 30 according to the third configuration information set, where the beam recovery information includes beam indication information and/or terminal indication information. The fourth configuration information set is used for instructing the terminal to determine the beam selection and/or determine whether to report the beam recovery information according to the fourth configuration information set.

The first communication apparatus 304 is configured to transmit the configuration information set to the terminal. The first communication apparatus 304 may correspond to a transceiving antenna or the like.

Optionally, the first configuration information set includes configuration information of a first reference pilot resource set used for the beam quality monitoring.

Optionally, the second configuration information set includes configuration information of a second reference pilot resource set used for the beam selection.

It is to be added that the base station 30 may perform any step of the method of the transmitting end in the embodiment 1.

Figure 4:
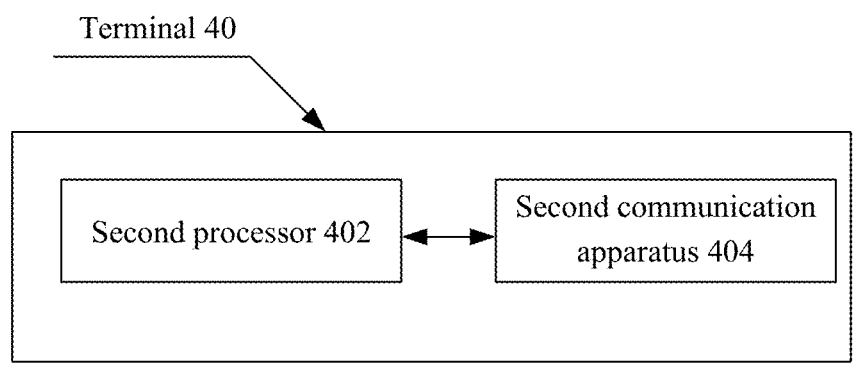
FIG. 4 is a structural diagram of hardware of a terminal according to an embodiment of the present disclosure.

Another embodiment of the present disclosure further provides a terminal 40. FIG. 4 is a structural diagram of hardware of a terminal 40 according to an embodiment of the present disclosure. As shown in FIG. 3, the terminal 40 includes a second communication apparatus 404 and a second processor 402.

The second communication apparatus 404 is configured to receive a configuration information set for instructing the terminal 40 to perform a beam recovery and transmitted by a base station.

The second processor 402 is configured to perform, according to the configuration information set, at least one of operations described below. The second processor 402 determines first configuration information used for beam quality monitoring according to the configuration information set, and the terminal 40 performs the beam quality monitoring according to the first configuration information. The second processor 402 determines fourth configuration information used for determining a beam selection and/or determining whether to report beam recovery information according to the configuration information set, and the terminal 40 determines the beam selection and/or determine whether to report the beam recovery information according to the fourth configuration information.

Optionally, the second processor 402 is further configured to determine second configuration information used for the beam selection according to the configuration information set. When a new beam needs to be selected, the terminal 40 performs the beam selection according to the second configuration information.

Optionally, the second processor 402 is further configured to determine third configuration information used for reporting the beam recovery information according to the configuration information set. When the beam recovery information needs to be reported, the terminal 40 reports the beam recovery information according to the third configuration information.

It is to be added that the terminal 40 may perform any step of the method of the receiving end in the embodiment 1.

An embodiment of the present disclosure further provides a communication system including a base station and a terminal.

The base station determines a configuration information set for instructing the terminal to perform a beam recovery. The configuration information set includes at least one of: a first configuration information set, a second configuration information set, a third configuration information set or a fourth configuration information set. The first configuration information set is used for instructing the terminal to perform beam quality monitoring according to the first configuration information set. The second configuration information set is used for instructing the terminal to perform a beam selection according to the second configuration information set. The third configuration information set is used for instructing the terminal to report beam recovery information to the base station according to the third configuration information set, where the beam recovery information includes beam indication information and/or terminal indication information. The fourth configuration information set is used for instructing the terminal to determine the beam selection and/or determine whether to report the beam recovery information according to the fourth configuration information set.

The base station transmits the configuration information set to the terminal.

An embodiment of the present disclosure provides a storage medium. The storage medium includes stored programs which, when executed, perform steps of the method according to any one of the embodiments described above, for example, the method shown in FIG. 2. Optionally, the storage medium may be a non-transitory storage medium.

An embodiment of the present disclosure provides a processor. The processor is configured to execute programs, which, when executed, perform the steps of the method according to any one of the embodiments described above.

An embodiment of the present disclosure further provides a communication device including a memory and a processor. The memory is configured to store computer-executable instructions. The processor is connected to the memory and configured to execute the computer-executable instructions to implement the any one of beam recovery processing methods described above, for example, one or more of the beam recovery processing methods performed by a transmitting end or one or more of the beam recovery methods performed by a receiving end.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

In the technical solutions of the present disclosure, the transmitting end instructs the receiving end to perform the beam recovery according to the configuration information set so that the receiving end may perform the beam recovery according to configuration information by itself when a quality of a serving beam decreases, thereby avoiding the problem of a communication quality decline due to an inability to recover the beam or quickly recover the beam after the quality of the serving beam decreases, achieving quick beam switching, providing positive beneficial effects. Meanwhile, the technical solutions are convenient to implement and can be widely implemented in the industry.

What is claimed is:

1. A beam recovery processing method, comprising:
determining, by a transmitting end, a configuration information set for instructing a receiving end to perform a beam recovery; wherein the configuration information set comprises a fourth configuration information set, used for instructing the receiving end to determine the beam selection and/or whether to report the beam recovery information according to the fourth configuration information set, and the configuration information set further comprises at least one of:
a first configuration information set, used for instructing the receiving end to perform beam quality monitoring according to the first configuration information set;
a second configuration information set, used for instructing the receiving end to perform a beam selection according to the second configuration information set; or
a third configuration information set, used for instructing the receiving end to report beam recovery information to the transmitting end according to the third configuration information set, wherein the beam recovery information comprises beam indication information and/or receiving end indication information; and
transmitting, by the transmitting end, the configuration information set to the receiving end;
wherein the fourth configuration information set comprises one of the following:
configuration information of a first set of preset conditions used for determining the beam selection and/or determining whether to report the beam recovery information, wherein a preset condition in the first set of preset conditions is used by the receiving end to perform the beam quality monitoring; or
configuration information of a second set of preset conditions for determining the beam selection, wherein a preset condition in the second set of preset conditions is used by the receiving end to perform the beam selection;
wherein in a case where the fourth configuration information set comprises configuration information of a first set of preset conditions used for determining the beam selection and/or determining whether to report the beam recovery information, the first set of preset conditions is configured in at least one of the following manners:
the transmitting end separately configures the first set of preset conditions and/or a first subset of preset conditions for different first reference pilot resource sets and/or subsets of the first reference pilot resource set used for the beam quality monitoring;
wherein in a case where the fourth configuration information set comprises configuration information of a second set of preset conditions for determining the beam selection, the second set of preset conditions is configured in at least one of the following manners:
the transmitting end separately configures the second set of preset conditions and/or a second subset of preset conditions for different second reference pilot resource sets and/or subsets of the second reference pilot resource set used for the beam selection; or a set of preset conditions is configured in at least one of the following manners:
the transmitting end configures a plurality of control channels, and separately configures a first set of preset conditions and/or a first subset of preset conditions and/or the second set of preset conditions and/or a second subset of preset conditions for different control channels;

the transmitting end separately configures the first set of preset conditions and/or the first subset of preset conditions and/or the second set of preset conditions and/or the second subset of preset conditions for different RRC state sets;

the transmitting end separately configures the first set of preset conditions and/or the first subset of preset conditions and/or the second set of preset conditions and/or the second subset of preset conditions for different beam reporting manners; or the transmitting end separately configures the first set of preset conditions and/or the first subset of preset conditions and/or the second set of preset conditions and/or the second subset of preset conditions for different beam recovery modes.

2. The method of claim 1, wherein in a case where the configuration information set comprises a first configuration information set or a second configuration information set, the first configuration information set comprises:

configuration information of a first reference pilot resource set used for the beam quality monitoring, or the second configuration information set comprises: configuration information of a second reference pilot resource set used for the beam selection;

wherein a type of a reference pilot resource comprises at least one of:

a channel state information reference signal (CSI-RS);

a physical downlink control channel (PDCCH) demodulation reference signal (DMRS); or a synchronization signal.

3. The method of claim 1, wherein in a case where the configuration information set comprises second configuration information set, the second configuration information set comprises:

configuration information of a second reference pilot resource set used for the beam selection;

wherein the determining, by the transmitting end, the configuration information set for instructing the receiving end to perform the beam recovery comprises:

configuring, by the transmitting end, at least one of the following information for the receiving end separately for different radio resource control (RRC) state sets:

the first reference pilot resource set and/or a subset of the first reference pilot resource set; or the second reference pilot resource set and/or a subset of the second reference pilot resource set;

or wherein determining, by the transmitting end, the configuration information set for instructing the receiving end to perform the beam recovery comprises:

configuring, by the transmitting end, a plurality of beam recovery modes, and configuring at least one of the following information separately for different beam recovery modes:

the first reference pilot resource set and/or a subset of the first reference pilot resource set; or the second reference pilot resource set and/or a subset of the second reference pilot resource set; or wherein determining, by the transmitting end, the configuration information set for instructing the receiving end to perform the beam recovery comprises:

configuring, by the transmitting end, a plurality of control channels, and configuring at least one of the following information separately for different control channels:

the first reference pilot resource set and/or a subset of the first reference pilot resource set; or the second reference pilot resource set and/or a subset of the second reference pilot resource set.

4. The method of claim 1, wherein in a case where the fourth configuration information set comprises configuration information of a first set of preset conditions used for determining the beam selection and/or determining whether to report the beam recovery information, the preset condition in the first set of preset conditions comprises a quality threshold and/or a time window, wherein within the time window, the receiving end performs beam monitoring and determines whether a beam quality is lower than the quality threshold.

5. The method of claim 1, wherein in a case where the fourth configuration information set comprises configuration information of a second set of preset conditions for determining the beam selection, the preset condition in the second set of preset conditions comprises a quality threshold and/or a time window, wherein within the time window, the receiving end performs beam monitoring and determines whether a beam quality is lower than the quality threshold.

6. The method of claim 1, wherein in a case where the configuration information set comprises a third configuration information set, the third configuration information set comprises one of the following:

a transmission resource configuration information set used for reporting the beam recovery information; wherein a transmission resource in the transmission resource configuration information set comprises at least one of: an uplink transmission antenna resource; an uplink transmission beam resource; an uplink time domain resource; an uplink frequency domain resource; an uplink code domain resource; or an uplink power resource;

a transmission manner configuration information set used for reporting the beam recovery information;

indication information for determining a priority of reporting the beam recovery information; or indication information of reporting content of the beam recovery information.

7. The method of claim 1, wherein in a case where the configuration information set comprises a third configuration information set, the third configuration information set is configured in at least one of the following manners:

the transmitting end separately configures the third configuration information set and/or a subset of the third configuration information set for different first reference pilot resource sets and/or subsets of the first reference pilot resource set used for the beam selection;

the transmitting end separately configures the third configuration information set and/or the subset of the third configuration information set for different first sets of preset conditions and/or first subsets of preset conditions for the beam quality monitoring;

the transmitting end separately configures the third configuration information set and/or the subset of the third configuration information set for different second sets of preset conditions and/or second subsets of preset conditions for the beam selection;

the transmitting end separately configures the third configuration information set and/or the subset of the third configuration information set for different RRC state sets;

the transmitting end separately configures the third configuration information set and/or the subset of the third configuration information set for different beam recovery modes; or the transmitting end separately configures the third configuration information set and/or the subset of the third configuration information set for different control channels.

8. A beam recovery method, comprising:
receiving, by a receiving end, a configuration information set for instructing the receiving end to perform a beam recovery and transmitted by a transmitting end; and
performing, by the receiving end, the following operations according to the configuration information set:
the receiving end determines first configuration information used for beam quality monitoring according to the configuration information set, and performs the beam quality monitoring according to the first configuration information; and
the receiving end determines fourth configuration information used for determining a beam selection and/or determining whether to report beam recovery information according to the configuration information set, and determines the beam selection and/or determines whether to report the beam recovery information according to the fourth configuration information;
wherein the fourth configuration information set comprises one of the following:
configuration information of a first set of preset conditions used for the beam selection and/or reporting the beam recovery information, wherein a preset condition in the first set of preset conditions is used by the receiving end to perform the beam quality monitoring; or
configuration information of a second set of preset conditions used for the beam selection, wherein a preset condition in the second set of preset conditions is used by the receiving end to perform the beam selection;
wherein in a case where the fourth configuration information set comprises configuration information of a first set of preset conditions used for the beam selection and/or reporting the beam recovery information, the first set of preset conditions is configured in at least one of the following manners:
the first set of preset conditions and/or a first subset of preset conditions is configured separately by the transmitting end for different first reference pilot resource sets and/or subsets of the first reference pilot resource set used for the beam quality monitoring;
wherein in a case where the fourth configuration information set comprises configuration information of a second set of preset conditions used for the beam selection, the second set of preset conditions is configured in at least one of the following manners:
the second set of preset conditions and/or a second subset of preset conditions is configured separately by the transmitting end for different second reference pilot resource sets and/or subsets of the second reference pilot resource set used for the beam selection; or the second set of preset conditions is configured in at least one of the following manners:
a plurality of control channels are configured by the transmitting end, and a first set of preset conditions and/or a first subset of preset conditions and/or the second set of preset conditions and/or a second subset of preset conditions is configured separately by the transmitting end for different control channels;
the first set of preset conditions and/or the first subset of preset conditions and/or the second set of preset conditions and/or the second subset of preset conditions is configured separately by the transmitting end for different RRC state sets;

the first set of preset conditions and/or the first subset of preset conditions and/or the second set of preset conditions and/or the second subset of preset conditions is configured separately by the transmitting end for different beam reporting manners; or
the first set of preset conditions and/or the first subset of preset conditions and/or the second set of preset conditions and/or the second subset of preset conditions is configured separately by the transmitting end for different beam recovery modes.

9. The method of claim 8, further comprising:
determining, by the receiving end, second configuration information used for the beam selection according to the configuration information set; and
when a new beam needs to be selected, performing, by the receiving end, the beam selection according to the second configuration information.

10. The method of claim 8, further comprising:
determining, by the receiving end, third configuration information for reporting the beam recovery information according to the configuration information set; and
when the beam recovery information needs to be reported, reporting, by the receiving end, the beam recovery information according to the third configuration information;
wherein the beam recovery information comprises beam indication information and/or receiving end indication information.

11. The method of claim 8, wherein the receiving end determines content of the beam recovery information according to at least one of:
a configuration signaling of the transmitting end; a radio resource control (RRC) state; a configuration of a reporting manner for the beam recovery information; a beam recovery mode;
a configuration of a second reference pilot resource set; a configuration of a first reference pilot resource set; a transmission configuration of a control channel; a measurement result of beam monitoring; a quality of a selected beam; a system duplex manner; or a configuration of an uplink control channel.

12. The method of claim 8, wherein in a case where the fourth configuration information set comprises configuration information of a first set of preset conditions used for the beam selection and/or reporting the beam recovery information, the first set of preset conditions comprises a quality threshold and/or a time window, wherein the quality threshold is used for determining to perform the beam selection and/or beam reporting, wherein the time window is used for a transmit beam quality detection or a beam pair link (BPL) quality detection.

13. The method of claim 8, wherein in a case where the fourth configuration information set comprises configuration information of a second set of preset conditions used for the beam selection, the second set of preset conditions comprises a quality threshold and/or a time window, wherein the receiving end determines whether to report the beam recovery information according to the quality threshold, wherein the time window is used for a transmit beam quality detection or a BPL quality detection.

14. The method of claim 8, wherein the receiving end determines the fourth configuration information according to at least one of:
a configuration signaling of the transmitting end; an RRC state; a configuration of a reporting manner for the beam recovery information; a beam recovery mode; a configuration of a second reference pilot resource set and/or a second reference pilot resource subset; a configuration of a first reference pilot resource set and/or a subset of the first reference pilot resource set; a transmission configuration of a control channel; or a receiving configuration of a terminal.

15. A communication system, comprising: a base station and a terminal;
wherein the base station determines a configuration information set for instructing the terminal to perform a beam recovery; wherein the configuration information set comprises a fourth configuration information set, used for instructing the receiving end to determine the beam selection and/or whether to report the beam recovery information according to the fourth configuration information set, and the configuration information set further comprises at least one of:
a first configuration information set, used for instructing the terminal to perform beam quality monitoring according to the first configuration information set;
a second configuration information set, used for instructing the terminal to perform a beam selection according to the second configuration information set; or
a third configuration information set, used for instructing the terminal to report beam recovery information to the base station according to the third configuration information set, wherein the beam recovery information comprises beam indication information and/or terminal indication information; and
the base station transmits the configuration information set to the terminal;
wherein the fourth configuration information set comprises one of the following:
configuration information of a first set of preset conditions used for determining the beam selection and/or determining whether to report the beam recovery information, wherein a preset condition in the first set of preset conditions is used by the receiving end to perform the beam quality monitoring; or
configuration information of a second set of preset conditions for determining the beam selection, wherein a preset condition in the second set of preset conditions is used by the receiving end to perform the beam selection;
wherein in a case where the fourth configuration information set comprises configuration information of a first set of preset conditions used for determining the beam selection and/or determining whether to report the beam recovery information, the first set of preset conditions is configured in at least one of the following manners:
the base station separately configures the first set of preset conditions and/or a first subset of preset conditions for different first reference pilot resource sets and/or subsets of the first reference pilot resource set used for the beam quality monitoring;
wherein in a case where the fourth configuration information set comprises configuration information of a second set of preset conditions for determining the beam selection, the second set of preset conditions is configured in at least one of the following manners:
the base station separately configures the second set of preset conditions and/or a second subset of preset conditions for different second reference pilot resource sets and/or subsets of the second reference pilot resource set used for the beam selection; or a set of preset conditions is configured in at least one of the following manners:
the base station configures a plurality of control channels, and separately configures a first set of preset conditions and/or a first subset of preset conditions and/or the second set of preset conditions and/or a second subset of preset conditions for different control channels;
the base station separately configures the first set of preset conditions and/or the first subset of preset conditions and/or the second set of preset conditions and/or the second subset of preset conditions for different RRC state sets;
the base station separately configures the first set of preset conditions and/or the first subset of preset conditions and/or the second set of preset conditions and/or the second subset of preset conditions for different beam reporting manners; or
the base station separately configures the first set of preset conditions and/or the first subset of preset conditions and/or the second set of preset conditions and/or the second subset of preset conditions for different beam recovery modes.

16. A non-transitory storage medium, which is configured to store computer-executable instructions which, when executed, implement the beam recovery processing method of claim 1.

17. A non-transitory storage medium, which is configured to store computer-executable instructions which, when executed, implement the beam recovery method of claim 8.

18. A communication device, comprising:
a memory, configured to store computer-executable instructions; and
a processor, connected to the memory and configured to execute the computer-executable instructions to implement the beam recovery processing method of claim 1.

19. A communication device, comprising:
a memory, configured to store computer-executable instructions; and
a processor, connected to the memory and configured to execute the computer-executable instructions to implement the beam recovery method of claim 8.

* * * * *